UNITED STATES PATENT OFFICE.

RENÉ BOHN, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PIGMENT AND PROCESS OF MAKING THE SAME.

1,055,701. Specification of Letters Patent. Patented Mar. 11, 1913.

No Drawing. Application filed January 27, 1909. Serial No. 474,486.

*To all whom it may concern:*

Be it known that I, RENÉ BOHN, doctor of philosophy and chemist, citizen of the Swiss Republic, residing at Mannheim, Germany, have invented new and useful Improvements in Pigments and Processes of Making the Same, of which the following is a specification.

It is known that indanthrene and similar vat coloring matters can be reduced to their soluble leuco compounds by heating them with a reducing agent in the presence of alkali and water, indeed, the principal processes for dyeing and printing with indanthrene are based upon this treatment. The indanthrene dye vat is usually prepared by reducing indanthrene by means of sodium hydrosulfite in alkaline solution, sufficient water being taken to permit readily of complete solution. I have discovered that indanthrene and other vat coloring matters of the anthracene series (either as such or in the form of their leuco compounds, which for the purpose of my invention are equivalent) can be brought into a condition especially suitable for use as pigments by heating them with a carbohydrate, such for instance as grape sugar, in the presence of alkali, but to produce this effect the quantity of solvent used should be so chosen that as little as possible of the coloring matter goes into solution, and to this end air can be passed through the reaction liquid either during the heating or subsequently. Indanthrene which has been thus treated possesses a greater coloring power and also a brighter and greener shade of blue than before such treatment.

As instances of vat coloring matters other than indanthrene which can be treated according to this invention, I mention violanthrene coloring matters and those obtainable by heating amino-anthraquinones with a metal in the presence of sulfuric acid, but the coloring matter is not affected to the same degree in all cases.

My new products are characterized by the following properties. Each of them is insoluble in water and in dilute acids and alkalis, slightly soluble in boiling nitrobenzene and soluble in alkaline hydrosulfite solution, forming a vat which dyes cotton. On being dissolved in alkaline hydrosulfite solution and then precipitated therefrom by means of a rapid current of air, they each yield a product which when employed as a pigment possesses considerably less covering power than my corresponding new product.

The following example will serve to illustrate further the nature of my invention and how it can be carried into practical effect, but the invention is not confined to this example. The parts are by weight.

Dilute one thousand parts of a ten per cent. paste of indanthrene blue RS with nine thousand parts of water, add nine hundred parts of a thirty-five per cent. caustic soda solution and five hundred parts of grape sugar, and boil for from thirty, to sixty minutes. Should any portion of the coloring matter be in solution, pass air through the reaction mixture until the filtrate of a test portion is colorless. Then filter the reaction mass and wash the residue well with water. If no part of the coloring matter be dissolved, the passing of air through the mixture can be dispensed with.

Now what I claim is:—

1. The process of preparing vat coloring matters of the anthracene series suitable for use as a pigment by heating such vat coloring matter with a carbohydrate and alkali and an amount of solvent insufficient to dissolve the coloring matters, substantially as described.

2. The process of preparing vat coloring matter of the anthracene series suitable for use as a pigment by heating such vat coloring matter with grape sugar and caustic soda and an amount of solvent insufficient to dissolve the coloring matter, substantially as described.

3. The process of preparing indanthrene suitable for use as a pigment by heating the said indanthrene with grape sugar and caustic alkali and an amount of solvent insufficient to dissolve the indanthrene, substantially as described.

4. As a new product a pigment consisting of an indanthrene coloring matter in a new physical condition, being insoluble in water and in dilute acids and alkalis, slightly soluble in boiling nitrobenzene and soluble in alkaline hydrosulfite solution, forming a vat which dyes cotton, and on being dissolved in alkaline hydrosulfite solution and precipitated therefrom by means of a rapid current of air yields a product which when employed as a pigment possesses considerably less covering power than my new product.

5. As a new product a pigment consisting of indanthrene blue in a new physical condition, being insoluble in water and in dilute acids and alkalis, slightly soluble in boiling nitrobenzene and soluble in alkaline hydrosulfite solution, forming a vat which dyes cotton blue, and which upon being dissolved in alkaline hydrosulfite solution and being precipitated therefrom by means of a rapid current of air gives rise to a product which, when employed as a pigment possesses considerably less covering power and a less greenish tint of blue than my new product.

In testimony whereof I have hereunto set my hand in the presence of two subscribing witnesses.

RENÉ BOHN.

Witnesses:
J. ALEC. LLOYD,
TERESA CATTURANI.

Copies of this patent may be obtained for five cents each, by addressing the "Commissioner of Patents, Washington, D. C."